(12) United States Patent
Klein et al.

(10) Patent No.: US 7,526,291 B2
(45) Date of Patent: Apr. 28, 2009

(54) METHOD AND APPARATUS FOR MANAGING SUPPLEMENTAL CHANNEL DATA RATES

(75) Inventors: Thierry E. Klein, Fanwood, NJ (US); Aleksandr Stolyar, Basking Ridge, NJ (US); Stan Vitebsky, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 649 days.

(21) Appl. No.: 11/133,982

(22) Filed: May 20, 2005

(65) Prior Publication Data

US 2006/0264226 A1    Nov. 23, 2006

(51) Int. Cl.
H04Q 7/20    (2006.01)
H04B 7/00    (2006.01)

(52) U.S. Cl. .................... 455/450; 455/452.1; 455/453; 455/277.2

(58) Field of Classification Search .................. 455/522, 455/67.1, 69, 127.1, 524, 525, 562.1, 450, 455/452.1, 453
See application file for complete search history.

(56) References Cited

U.S. PATENT DOCUMENTS

| | | | |
|---|---|---|---|
| 4,829,566 A | 5/1989 | Lassaux et al. | |
| 5,181,229 A | 1/1993 | Langlais et al. | |
| 6,201,971 B1 * | 3/2001 | Purnadi et al. | 455/450 |
| 6,590,890 B1 | 7/2003 | Stolyar et al. | |
| 6,611,515 B1 | 8/2003 | Balachandran et al. | |
| 6,618,598 B1 | 9/2003 | Gandhi et al. | |
| 6,625,133 B1 | 9/2003 | Balachandran et al. | |
| 6,662,019 B2 * | 12/2003 | Kamel et al. | 455/522 |
| 6,738,632 B2 | 5/2004 | D'herbemont et al. | |
| 6,829,468 B2 | 12/2004 | Gandhi et al. | |
| 6,842,441 B2 | 1/2005 | Balogh et al. | |
| 6,859,446 B1 | 2/2005 | Gopalakrishnan et al. | |
| 7,099,682 B2 * | 8/2006 | Ben-Eli | 455/513 |
| 2005/0113106 A1 * | 5/2005 | Duan et al. | 455/452.2 |

* cited by examiner

Primary Examiner—Tilahun B Gesesse

(57) ABSTRACT

There is provided a method and apparatus for managing supplemental channel data rates in a wireless telephone system. More specifically, there is provided a method comprising determining latency values for each of a plurality of mobile devices, determining fairness values for each of the plurality of mobile devices, and ranking the plurality of mobile devices based on the latency values and the fairness values to create a ranked list of mobile devices that can be employed to manage supplemental data rates for the plurality of mobile devices.

18 Claims, 4 Drawing Sheets

METHOD AND APPARATUS FOR MANAGING SUPPLEMENTAL CHANNEL DATA RATES

BACKGROUND OF THE INVENTION

1. Field of the Invention

The present invention relates generally to telecommunications and, more particularly, to managing supplemental channel data rates in a wireless telephone system.

2. Description of the Related Art

This section is intended to introduce the reader to various aspects of art that may be related to various aspects of the present invention, which are described and claimed below. This discussion is believed to be helpful in providing the reader with background information to facilitate a better understanding of the various aspects of the present invention. Accordingly, it should be understood that these statements are to be read in this light, and not as admissions of prior art.

One of the paramount challenges facing modern wireless telephone systems is the rapid growth of consumer demand for data services such as Internet access, text messaging, and e-mail. In fact, consumers are demanding greater access to data-related services than ever before, and this trend is not likely to change. For example, in the coming years, consumers will likely expect their wireless telephones to provide many, if not all, of the communication features currently provided by computers (e.g., video conferencing, picture mail, etc.).

Unfortunately, building or upgrading the telecommunication infrastructure to support growing consumer demand is relatively expensive. As such, much research has been invested into determining better and more efficient methods for transmitting information over existing infrastructure. Early designs used multiple frequencies to simultaneously transmit multiple signals in parallel. This technology worked well with a small number of users, but as the number of user grew, there were simply not enough frequencies for each user. Code Division Multiple Access ("CDMA") is one technique that addresses this problem. In a CDMA system, wireless telephone calls are no longer divided by frequency. Rather all wireless telephone calls are transmitted at the same time and at the same frequency. While this technique may appear chaotic, each individual telephone or mobile device is able to recognize its call by a unique code assigned to that call. This unique code allows many users to share a single frequency.

Modern wireless telephone systems, such as CDMA 2000 3G-1X, CDMA 2000 1X EV-DV, CDMA 2000 3X, and WCDMA UMTS, provide at least two types of channels to transmit telephone calls or other data from a wireless telephone base station to a wireless device and vice versa. The first of these channels is known as the fundamental channel ("FCH"). Every wireless device in communication with a base station is assigned an FCH, which is typically configured to transmit at 9.6 kilobits per second ("Kb/s"). Due to the relatively low data rate of the FCH, FCHs are typically employed to transmit only voice data (i.e., telephone conversations), because voice data uses a relatively low and substantially stable data rate.

A second type of channel employed in modern wireless telephone systems is known as a supplemental channel ("SCH"). The SCH allows data rates of up to 307.2 Kb/s, and each mobile device can be allocated up to two SCHs at a time. Unlike the FCH, however, every wireless device in communication with a base station is not typically assigned an SCH. Rather, the base station temporarily establishes an SCH at a particular data rate when the base station has additional data to transmit to a particular wireless device. For example, if a user wishes to download a large picture from the Internet, the base station may assign the user's mobile device an SCH with a data rate of 300 Kb/s, for example, to use until the picture is downloaded. If, however, the user wishes to download a smaller text file, the base station may assign the user's mobile device an SCH with a data rate of 50 Kb/s, for example.

There are several factors, however, that complicate the assignment of SCHs in a wireless telephone system. First, is the allocation of transmission power. Transmission power is one of the base stations most important commodities, because there is a limited amount of transmission power available in a wireless telephone system. A portion of this transmission power is allocated to maintaining a constant data rate of 9.6 Kb/s for the FCH of every mobile device and for maintaining overhead channels (e.g., pilot, paging, and sync channels). The power that remains after the base station has allocated power to these channels can be allocated to the SCHs.

By increasing transmission power to a wireless device, the base station can improve the signal quality, the signal distance, the signal penetration, and/or the signal data rate. For example, it takes more power to transmit a signal to a mobile device that is relatively distant from the base station or to transmit a signal to a mobile device that is inside a building. Similarly, all other things being equal, it takes more transmission power to transmit a 300 Kb/s signal than a 50 Kb/s signal. As such, allocating data rates for SCHs amongst the users of the wireless telephone system can create conflicts amongst users. For example, establishing a 50 Kb/s supplemental channel with a user inside a building that is relatively far from the base station may use the same amount of transmission power as three 300 Kb/s SCHs for wireless devices relatively close (e.g., within a direct line of site) to the base station. As such, one of the challenges in allocating base station power is managing data rates for all of the users to most fairly or appropriately use the available transmission power.

Second, wireless telephone providers are interested in allocating bandwidth and throughput based on the Quality of Service ("QoS") parameters for each mobile devices. QoS enables differentiation between different types of applications or services on the wireless telephone network. To improve efficiency, modern wireless telephone systems may attempt to allocate data rates based on the QoS parameters for each particular application or service. For example, voice services may be assigned a lower data rate than web services. The particular QoS parameters may be determined by the operators of the wireless telephone service and may vary greatly depending on the particular service provided. Accordingly, efficiently managing the data rates to each of the mobile devices based on QoS parameters may also be beneficial.

Third, with rapid growth of data-based services, such as wireless Internet, wireless telephone providers may also be concerned with the Grade of Service ("GoS"). GoS enables differentiation between different classes of users. A wireless telephone provider may sell different services packages, referred to as GoS classes, at different prices. For example, a more expensive access package may provide higher data rates, while a less expensive access plan may provide only lower data rates. A system that can provide a variety of price/performance packages may be commercially advantageous to wireless telephone service providers.

Fourth, modern wireless telephone systems may also take into account fairness in assigning data rates. In an ideal system, it would be possible to satisfy the requirements of every mobile device of every user instantaneously. However, for a variety of reasons (such as those discussed above), this is generally not currently feasible. As such, some users may encounter delays or errors. Fairness concerns are directed towards insuring that these errors or delays are fairly apportioned amongst all of the users of the wireless telephone system depending on QoS parameters and GoS class, if applicable. For example, in a system employing an "equal throughput" fairness scheme, the wireless telephone system attempts to ensure that every user has equal data rates over time subject to QoS parameters and GoS class. Whereas, in a "proportional throughput" fairness scheme, the wireless telephone system attempts to ensure that every user has equal access to transmission power subject to QoS parameters and GoS class. As such, in a proportional throughput system, users farther away from the base station may be assigned lower data rates than closer users because, as described above, it takes more transmission power to transmit to mobile devices that are farther away.

A system that could manage the allocation of supplemental channel data rates in a wireless telephone system based on the factors outlined above would be advantageous.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one embodiment, there is provided a method comprising determining latency values for each of a plurality of mobile devices, determining fairness values for each of the plurality of mobile devices, and ranking the plurality of mobile devices based on the latency values and the fairness values to create a ranked list of mobile devices that can be employed to manage supplemental data rates for the plurality of mobile devices.

In another embodiment, there is provided a communications device comprising a module configured to determine latency values for each of a plurality of mobile devices, a module configured to determine fairness values for each of the plurality of mobile devices, and a module configured to rank the plurality of mobile devices based on the latency values and the fairness values to create a ranked list of mobile devices.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions should be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention are directed towards a system or a method for managing supplemental channels ("SCH") in a wireless telephone system, such as a code division multiple access ("CDMA") system. Specifically, in one embodiment, a transmitter may periodically rank the mobile devices communicating with a transmitter by fairness, latency, QoS parameters, or GoS class. The transmitter may use the rankings to assign supplemental channel data rates to the mobile devices.

Figure 1:
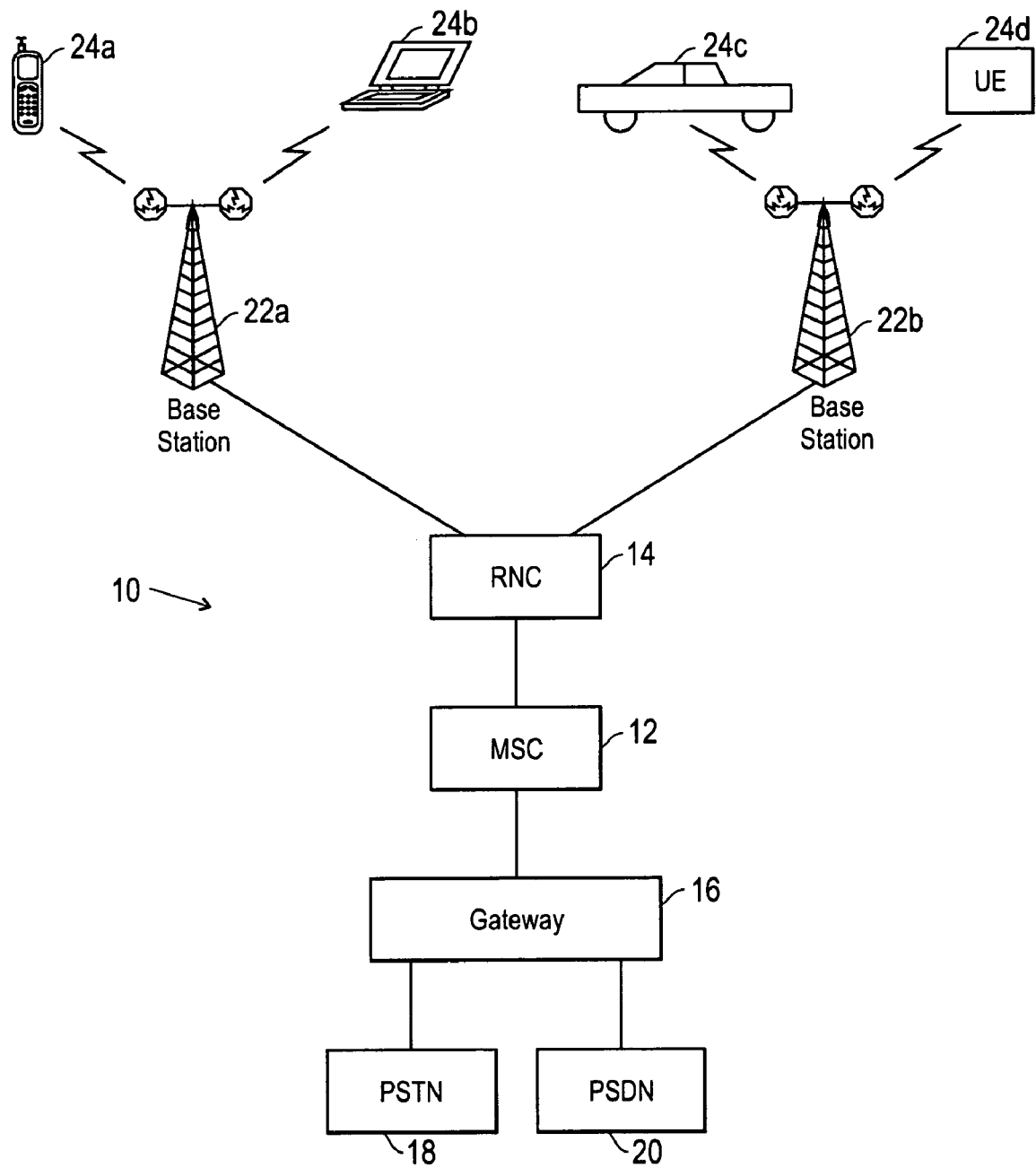
FIG. 1 illustrates a block diagram of an exemplary wireless telephone system in accordance with an embodiment of the present invention.

Turning now to the drawings, and referring initially to FIG. 1, a block diagram of an exemplary wireless telephone system is illustrated and generally designated by a reference numeral 10. Those of ordinary skill in the art will appreciate that the wireless telephone system 10, described below, illustrates merely one embodiment of a system configured to manage supplemental channels in a wireless telephone system, such as a CDMA telephone system. As such, those of ordinary skill in the art will appreciate that the techniques described herein may be employed in a wide variety of wireless telephone systems including, but not limited to CDMA2000 3G-1X, CDMA2000 1X EV-DV, CDMA2000 3X, and WCDMA UMTS. Moreover, it will also be appreciated that while the embodiment described below involves transmission from a base station to a mobile device (i.e., the forward link), with slight modifications, the techniques described herein could also be employed for communication over the reverse link (i.e., from the mobile device to the base station).

In any given wireless telephone market, such as a typical metropolitan area, the wireless telephone system 10 may include at least one mobile switching center ("MSC") 12. The MSC 12 is a switch that serves the wireless telephone system 10. The primary purpose of the MSC 12 is to provide a voice path and/or a data path between a mobile device and another telephone or data source. The typical MSC 12 includes a number of devices, such as computerized call routers, that control switching functions, call processing, channel assignments, data interfaces, tracking, paging, call handoff, and user billing. The MSC 12 may be coupled to a gateway 16, which in turn may be coupled to a public switched telephone network ("PSTN") 18, which is often referred to as a land line telephone network. The wireless telephone system 10 typically includes a connection to the PSTN 18, because a majority of all wireless telephone calls pass through the PSTN 18. The gateway 16 may also be coupled to a packet switch data network ("PSDN") 20, such as the Internet, so as to provide Internet service to wireless telephone users.

One or more radio network controllers ("RNC") 14 may also be coupled to the MSC 12. The RNC 14 may control the use and reliability of radio resources within the wireless telephone system 10. Specifically, the RNC 14 may control the allocation and release of specific radio resources to establish a connection between mobile devices (see below) and the MSC 12.

The RNC 14 may be communicatively coupled either by wire or wirelessly to one or more base stations 22a and 22b. The base stations 22a and 22b are transmission and reception stations that act as access points for network traffic from a variety of mobile devices 24a, 24b, 24c, and 24d. As such, the base stations 22a and 22b may communicate voice or data with any suitable mobile device, such as a portable wireless telephone 24a, a laptop computer 24b, a vehicle system 24c, or other user equipment 24d. While only two base stations 22a and 22b are illustrated in FIG. 1, those of ordinary skill in the art will appreciate that any suitable number of base stations 22a and 22b may be coupled to the RNC 14. Further, it should be understood that the RNC 14 and/or the base stations 22a and 22b, may include, among other things, a CDMA transmitter, as will be described further below with regard to FIGS. 2.

Figure 2:
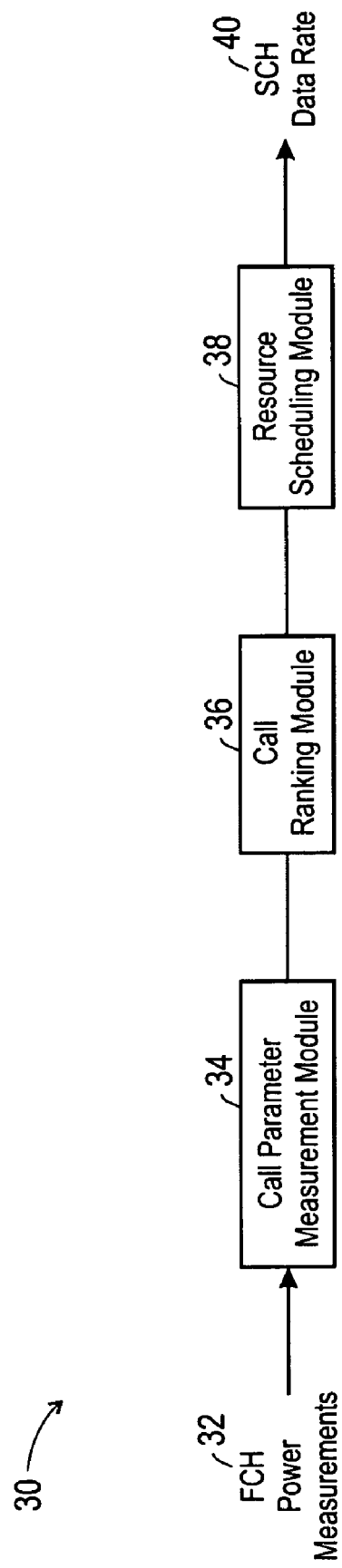
FIG. 2 illustrates a block diagram of an exemplary wireless transmitter in accordance with an embodiment of the present invention.

FIG. 2 illustrates a block diagram of an exemplary wireless telephone transmitter 30 in accordance with one embodiment. The CDMA transmitter 30 may be fully or partially disposed within the RNC 14 or the base stations 22a and 22b. As illustrated in FIG. 2, the CDMA transmitter 30 comprises a series of modules represented by blocks 34, 36, and 38. The modules (blocks 34, 36, and 38) may be hardware, software, firmware, or some combination of hardware, software, and firmware. Additionally, an individual module does not necessarily solely comprise each illustrated module function. The modules shown in the blocks 34, 36, and 38 are merely one example and other examples can be envisaged wherein the functions are distributed differently or where some modules are included and other modules are not included. For example, in one alternate embodiment, the modules 34, 36, and 38 may be consolidated or rearranged within a transceiver capable of both receiving and transmitting CDMA signals.

As illustrated in FIG. 2, the call parameter measurement module 34 receives fundamental channel ("FCH") power measurements 32 from a component within the RNC 14, the base stations 22a and 22b, or the wireless devices 24a-24d. As will be described further below in regard to FIG. 3, the call parameter measurement module 34 may use the FCH power measurements to calculate power adjustment factors for each of the wireless devices in communication with the CDMA transmitter 30. Once the call parameter measurement module 34 has computed power adjustment factors, the call ranking module 36 may use the power adjustment factors in combination with other information to calculate latency components, fairness components, and rankings for each of the wireless devices 24a-24d, as will be described further below. Lastly, the resource scheduling module 38 may employ the rankings determined by the call ranking module 36 to adjust data rates 40 of the SCHs amongst the wireless devices 24a-24d. Once adjusted, the SCH data rates 40 can be transmitted to other modules within the RNC 14 or the base stations 22a and 22b (not shown) to serve as the basis for transmissions to the mobile devices 24a-24d.

Figure 3:
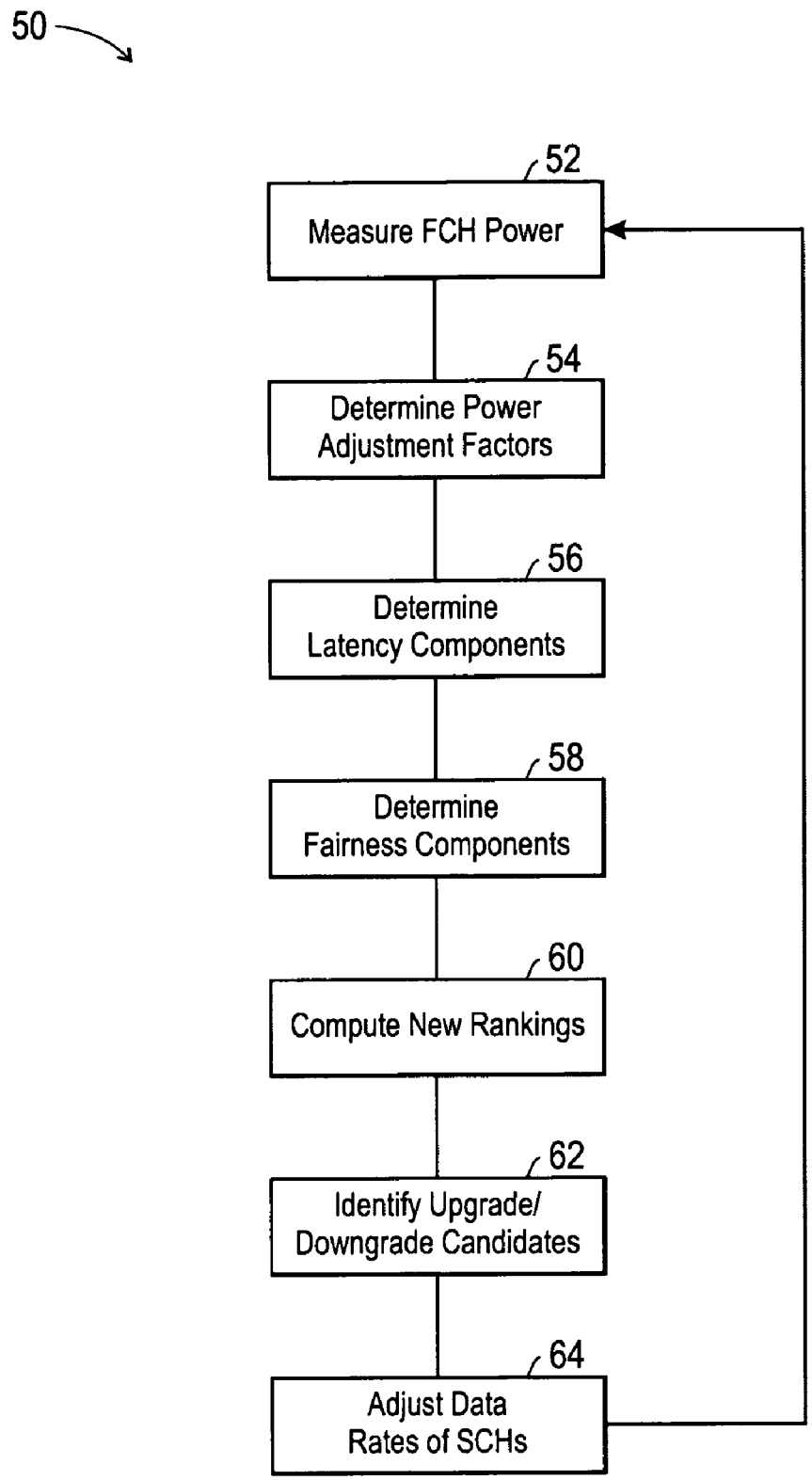
FIG. 3 is a flow chart illustrating an exemplary technique for managing supplemental channel data rates in accordance with an embodiment of the present invention.

FIG. 3 is a flowchart illustrating an exemplary technique 50 for managing supplemental channel data rates in accordance with one embodiment. As will be described below, the wireless telephone transmitter 30 may execute the technique 50 to manage supplemental data rates in one embodiment. Those of ordinary skill in the art will appreciate that the "channel" is the path that the signal travels from the base stations 22a and 22b to each of the mobile devices 24a-d. The channel condition can be affected by various things, such as the Earth's magnetic field, obstacles between the base stations 22a and 22b and the mobile devices 24a-d, and the transmission distance. For example, one of the mobile devices 24a-d inside a building may have a more degraded channel condition than one of the mobile devices 24a-d located within a direct line of sight of the base stations 22a and 22b. As described above, it may take more transmission power to transmit the same data rate to a user with a degraded channel condition. For this reason, it is beneficial for the base stations 22a and 22b to gauge the relative channel condition for each user.

As such, the call parameter measurement module 34 within the transmitter 30 begins by measuring the FCH transmit power for all active calls (the mobile devices 24a-d), as indicated by block 52. As described above, the base stations 22a and 22b maintain the FCH at a data rate of 9.6 Kb/s for all active mobile devices. As such, the transmission power needed to maintain this constant data rate provides a measurement of channel condition. In particular, those users that need higher transmission power to maintain the 9.6 Kb/s data rate for their FCH are deemed to have more degraded channel conditions than users that use less power.

Accordingly, the call parameter measurement module 34 may employ the FCH transmission power to determine a power adjustment factor $W_{PWR}$ that indicates a relative channel condition for each of the mobile devices 24a-d, as illustrated in block 54. In one embodiment, the power adjustment factor $W_{PWR}$ is determined by comparing the transmission power for each FCH to the transmission power of the pilot channel. Those of ordinary skill in the art will appreciate that the pilot channel is transmitted at a relatively high constant power level. In one embodiment, the FCH transmission power is compared to the pilot channel transmission power using the following look-up table:

TABLE 1

| FCH Power/Pilot Power (dB) | Power Adjustment Factor $W_{PWR}$ |
| --- | --- |
| X <= −16 | 1 |
| −16 < X <= −14 | 2 |
| −14 < X <= −12 | 3 |
| −12 < X <= −10 | 4 |
| −10 < X <= −8 | 6 |
| −8 < X <= −6 | 10 |
| −6 < X <= −4 | 16 |
| −4 < X <= 2 | 25 |
| −2 < X <= 0 | 40 |
| X > 0 | 50 | where X is the FCH transmission power divided by the pilot channel transmission power in decibels (dB). As Table 1 indicates, the higher the FCH transmission power (i.e., closer to the pilot channel transmission power), the higher the power adjustment factor. The power adjustment factor $W_{PWR}$ provides a mechanism for cross-leveling the data rate of the SCH, if appropriate, to account for differences in channel condition between users. For example, it may take fifty times the transmission power to maintain a particular data rate when X equals zero versus when X equals minus sixteen. As such, the power adjustment factor permits more even comparisons amongst different mobile devices 24a-d. Those skilled in the art will appreciate that the power adjustment factors listed in Table 1 are merely one approximation of the effects of different channel conditions. As such, in alternate embodiments, the power adjustment factors may correlate to different decibel values.

Once the power adjustment factor has been determined, the call ranking module 36 may determine a latency component ($T_{current}^i$), as indicated by block 56. The latency component is a measure of how the data rate for a particular user has historically measured against a minimum data rate $R_{MIN}^i$ for that particular user. In other words, the latency component measures how well served the users of the wireless telephone system has been historically. For example, if one user has been consistently receiving at least their minimum data rate, that user will have a lower latency value than another user that has been periodically denied their minimum data rate. The minimum data rate for each user may be determined by the capacity of the wireless telephone system 10 and the QoS parameters and/or the GoS class of that particular user. For example, a text messaging mobile device may have one minimum rate, while an Internet-enabled wireless telephone may a different, higher minimum data rate, while a user with a relatively more expensive data package (i.e., GoS class) may have a still higher data rate.

Figure 4:
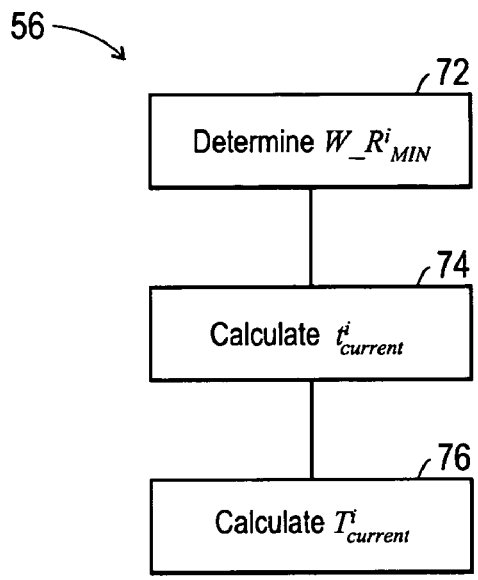
FIG. 4 is a flow chart illustrating an exemplary technique for calculating a latency component in accordance with an embodiment of the present invention.

FIG. 4 is a flow chart illustrating an exemplary technique 56 for calculating a latency component $T_{current}^i$ in accordance with an embodiment. The first step in determining the latency component $T_{current}^i$ is to determine $W\_R_{MIN}^i$, as indicated in block 72. $W\_R_{MIN}^i$ is a parameter that permits the call ranking module 36 to effectively adjust the minimum data rate $R_{MIN}^i$ for each of the mobile devices 24a-d based on the system load for the particular base station 22a or 22b. In one embodiment, the system load is determined based on the average latency counter $T_{current}^{Avg}$ where $$T_{current}^{Avg} = \frac{1}{\text{num\_users}} \sum_{i=1}^{\text{num\_users}} T_{current}^i.$$

Once $T_{current}^{Avg}$ is computed, $W_{13} R_{MIN}^i$ can be updated according to the following relationships:

1. If the average latency counter is such that $T_{current}^{Avg} < T_{MAX}/4$, then set $W\_R_{MIN}^i = \min(R_{MIN}^i, R_{Req}^i)$ for all users.
2. If the average latency counter is such that $T_{MAX}/4 \leq T_{current}^{Avg} < T_{MAX}/2$ and user's $W\_R_{MIN}^i > 0$ then set $W\_R_{MIN}^i = \min(R_{MIN}^i, R_{Req}^i)$ for that user.
3. If the average latency counter is such that $T_{MAX}/4 \leq T_{current}^{Avg} < T_{MAX}/2$ and user's $W\_R_{MIN}^i = 0$ then keep $W\_R_{MIN}^i = 0$ for that user.
4. If the average latency counter is such that $T_{current}^{AVG} \geq T_{MAX}/2$, keep $W\_R_{MIN}^i = 0$ for the user whose $W\_R_{MIN}^i = 0$, set $W\_R_{MIN}^i = 0$ for the user with the highest $W_{PWR}$ whose current $W\_R_{MIN}^i > 0$, and $W\_R_{MIN}^i = \min(R_{MIN}^i, R_{Req}^i)$ for the rest of the users whose $W\_R_{MIN}^i > 0$.

where $T_{max}$ is a pre-defined maximum latency value (e.g., 1024), $R_{MIN}^i$ is the preprogrammed minimum data rate for a particular mobile device i (as determined by the capacity of the wireless telephone system 10, by QoS parameters, and/or by GoS class), $R_{Req}^i$ is a data rate requested by the mobile device i, and $W_{PWR}$ is the power adjustment factor described above.

Those of ordinary skill in the art will understand that if the channel conditions for a user are particularly degraded, relationships 3 and 4 above may result in the $W\_R_{MIN}^i$ being set to zero. This is done to prevent the latency component for the mobile devices 24a-d from rapidly growing to $T_{max}$, because the $R_{MIN}^i$ cannot be satisfied due to the channel conditions.

Once $W\_R_{MIN}^i$ has been determined, the technique 56 may continue by calculating $t_{current}^i$, as indicated in block 74. As described below, $t_{current}^i$ is an intermediate calculation that facilitates the differentiation of users that have requested an SCH from users that have not requested an SCH. As such, if the data rate requested by mobile device i($R_{Req}^i$) is greater than zero, $t_{current}^i$ is computed as:

$$t_{current}^i = \max\{T_{old}^i - (\text{Frame\_count}^i - W\_R_{MIN}^i), 0\} \quad \text{Equation 1}$$

where $T_{old}^i$ is the latency component for the mobile device i that was determined in a previous iteration of the technique 50, the Frame_count$^i$ is the number of double sized radio link protocol ("RLP") frames that were actually transmitted to the mobile device i since the previous iteration of the technique 50 (e.g., 16 RLP frames or 0.32 seconds), and, as described above, $W\_R_{MIN}^i$ is a throughput parameter that is dynamically derived from the minimum data rate $R_{MIN}^i$ and the requested data rate $R_{Req}^i$. For new calls, the value of $T_{old}^i$ is set to $T_{current}^{Avg}$. For calls transferred from another one of the base stations 22a and 22b (i.e., handed off), the $T_{old}^i$ value from the previous base station is maintained if available, but if a transferred $T_{old}^i$ value is not available, $T_{old}^i$ is set to $T_{current}^{Avg}$.

If, on the other hand, the data rate requested by the user $R_{Req}^i$ is equal to zero (i.e., the user did not request any data or the FCH is sufficient to transmit any requested data), $t_{current}^i$ is computed as:

$$t_{current}^i = \max\{T_{old}^i - T_{Decay}, 0\} \quad \text{Equation 2}$$

where $T_{Decay}$ is a parameter tunable by a designer of the system 10 to determine the rate at which the latency component automatically reduces when a user is satisfied, including periods when the requested data rate is zero. In one embodiment, the value of $T_{Decay}$ is subscribed to the minimum data rate $R_{MIN}^i$. Once $t_{current}^i$ has been computed, the call ranking module 36 may calculate the latency component $T_{current}^i$ using the equation $T_{current}^i = \min\{t_{current}^i, T_{max}\}$, as indicated by block 76.

Figure 5:
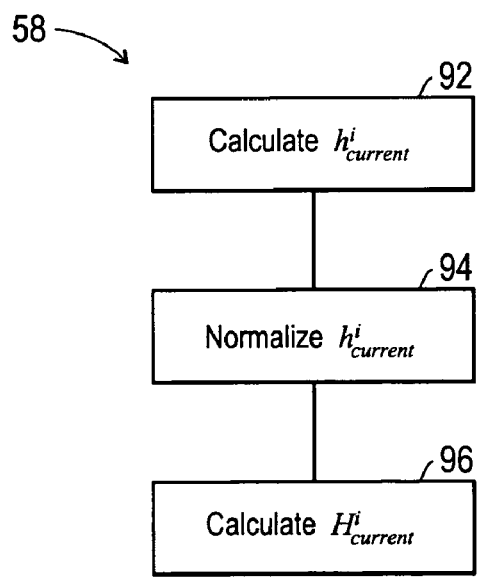
FIG. 5 is a flow chart illustrating an exemplary technique for calculating a fairness component in accordance with an embodiment of the present invention.

Returning to FIG. 3, once the latency component has been determined, the call ranking module 36 may determine a fairness component $H_{current}^i$, as indicated in block 58. FIG. 5 is a flow chart illustrating the exemplary technique 58 for calculating a fairness component in accordance with one embodiment. Those of ordinary skill in the art will appreciate that while the technique 58 is described below in regard to both equal throughput and proportional throughput fairness schemes, these two schemes are merely exemplary, and in alternate embodiments, different fairness schemes as known to those of ordinary skill in the art, may be employed.

As indicated by block 92, the first step in the technique 90 may comprise determining $h_{current}^i$. For each mobile device i, if $T_{current}^i < T_{max}/2$, $h_{current}^i$ is given by the following equation:

$$h_{current}^i = H_{old}^i - W^i * \text{Frame\_count}^i \quad \text{Equation 3}$$

where $W^i = 8 * W_{PRIO}^i$ for the equal throughput fairness scheme and $W^i = W_{PWR}^i * W_{PRIO}^i$ for the proportional throughput fairness scheme ($W_{PRIO}^i = 1$ if QoS is not supported, and otherwise $W_{PRIO}^i = 2, 1, \frac{1}{2}$ depending on user's QoS priority class) and $H_{old}^i$ is the fairness component determined in a previous iteration of the technique 50.

If, on the other hand, $T_{current}^i \geq T_{max}/2$, $h_{current}^i = H_{old}^i$. This maintains a constant fairness component (as described below) for users with a threshold latency of greater than or equal to $T_{max}/2$. Maintaining a constant fairness component is done to prevent users with a latency above half the maximum latency (i.e., historically under-served users) from being reduced in the rankings based on a reduced fairness component. Those of ordinary skill in the art will appreciate that maintaining a constant fairness component for these users is a design choice that can be modified or omitted in alternate embodiments. Moreover, the threshold latency of greater than or equal to $T_{max}/2$ is also a design choice that may be altered in alternate embodiments.

Once $h^i_{current}$ has been determined, the call ranking module 36 may normalize $h^i_{current}$, as indicated in block 94. Normalizing $h^i_{current}$ eliminates the possibility that $h^i_{current}$ could be a negative value and ensures that $h^i_{current}$ does not exceed a predetermined maximum value $H_{max}$. For example, $H_{max}$ may be set to a value of 65,536. In one embodiment, the call ranking module 36 normalizes $h^i_{current}$ by subtracting the smallest negative $h^i_{current}$ from the $h^i_{current}$ of all users such that there will be no negative values. Further, the $h^i_{current}$ values that exceed $H_{max}$ may be reduced to the predetermined maximum value.

After $h^i_{current}$ has been normalized, $H^i_{current}$ may be calculated, as indicated in block 96. In one embodiment, $H^i_{current}$ is calculated with the following equation:

$$H^i_{current} = \min\{h^i_{current} - \min_{all\_users}(h^i_{current}), H_{max}\} \quad \text{Equation 4}$$

In one embodiment, the call ranking module 36 also computes the maximum H value among all "unsatisfied" users. Unsatisfied users comprise those mobile devices 24a-d that previously requested a certain data rate, but were allocated a SCH with less than the requested data rate. Once computed, the call ranking module 36 may use the maximum H for all unsatisfied users to cap the H values for the satisfied users.

Returning once more to FIG. 3, once the fairness components have been determined, the call ranking module 36 may compute rankings for each of the users (i.e., each of the mobile devices 24a-d), as indicated in block 60. In one embodiment, new rankings for each of the users are computed using the following equation:

$$P^i_{current} = H^i_{current} + f(T^i_{current}) + (1-pco)C^i L_{max} \quad \text{Equation 5}$$

where $f(x)$ is a faster-than-linear function of x (see below); $C^i=0$ if GoS classes are not supported and $C^i=0, 1,$ or 2 depending on the user's GoS class if GoS classes are supported; $L_{max}=H_{max}+f(T_{max})$; and pco is priority class overlap parameter that determines the effect of a user's GoS class (if applicable). For example, if pco equals 0.5, a user with a $C^i$ value equal to two (i.e., a high GoS class), may be increased in the rankings by a value equal to $L_{max}$ (i.e., $1-0.5*2*L_{max}$), for example. Whereas, if pco equals 0, a user with a $C^i$ value equal to two may be increased in the rankings by a value equal to two times $L_{max}$, for example As stated above, $f(x)$ is a faster-than-linear function of x. In one embodiment, $f(x)$ is defined as follows:

$$f(x) = \begin{cases} kx, & 0 \leq x < \dfrac{T_{max}}{4} \\ 2k\left(x - \dfrac{T_{max}}{8}\right), & \dfrac{T_{max}}{4} \leq x < \dfrac{T_{max}}{2} \\ 4k\left(x - \dfrac{5T_{max}}{16}\right), & \dfrac{T_{max}}{2} \leq x < \dfrac{3T_{max}}{4} \\ 8k\left(x - \dfrac{17T_{max}}{32}\right), & \dfrac{3T_{max}}{4} \leq x < T_{max} \end{cases} \quad \text{Equation 6}$$

where the k is a tuning value with a default value of one. Those of ordinary skill in the art will appreciate that the value of k can be altered to adjust the rankings.

Once each of the users has been ranked, the resource scheduling module 38 within the transmitter 30 continues by identifying upgrade candidates and downgrade candidates amongst the users, as indicated in block 62 of FIG. 2. In one embodiment, a user is designated as a downgrade candidate if: (1) the potential downgrade candidate has an active SCH channel, (2) the potential candidate has had the lowest ranking for a predetermined number ($N_{DOWN}$) of ranking computations in a row, (3) the resources available in the base station's cell are not sufficient for an upgrade candidate to at least double its data rate, and (4) the resources of the potential downgrade candidate can be freed up in time to help the upgrade candidate. If there are two or more users that have the same lowest ranking and both qualify to be downgrade candidates, then the user with the highest $W_{PWR}$ among them is chosen. However, if there are no upgrade candidates selected or if the resources currently available in the cell are sufficient for the upgrade candidate to at least double its current data rate, no downgrade candidate is selected. Those of ordinary skill in the art will appreciate that the above described downgrade criteria are merely exemplary and that in alternate embodiments, other suitable downgrade criteria may be employed.

Turning next to potential upgrade candidates, any user is a potential upgrade candidate (i.e., both users with an active SCH and user with just the FCH). In one embodiment, a user is designated as an upgrade candidate if (1) the potential upgrade candidate does not currently have an SCH data rate at the maximum allowable rate (R_max), (2) the potential candidate was the highest ranked user for a predetermined number ($N_{UP}$) of ranking computations in a row, (3) the potential candidate has a requested a higher data rate, and (4) the resource requirements for the next higher data rate do not exceed the resources that would be available if the downgrade candidate were to release all its current SCH resources. If there are two or more users that have the same ranking and both qualify to be upgrade candidates, the user with the lowest $W_{PWR}$ among them is chosen as the upgrade candidate. Those of ordinary skill in the art will appreciate that the above described upgrade criteria are merely exemplary and that in alternate embodiments, other suitable upgrade criteria may be employed.

Once the resource scheduling module 38 has identified upgrade candidates and downgrade candidates, it may adjust the data rates of the SCHs of the mobile devices 24a-d, as indicated in block 64. In particular, the resource scheduling module 38 may revoke or take away all the SCH resources allocated to the downgrade candidate and give them to the upgrade candidate. Those of ordinary skill in the art will appreciate that with the total SCH resources available to the upgrade candidate, it may be possible for the upgrade candidate to more than double its data rate. In one embodiment, the resource scheduling module 38 will increase the rate of the upgrade candidate as much as possible, while in another embodiment, the resource scheduling module will limit the upgrade candidate's data rate increase to a factor of two.

In the event that releasing all the SCH resources from the downgrade candidate is not enough to suitable increase the upgrade candidate's data rate (e.g., increasing by factor of two), the resource scheduling module may be configured to identify one or more additional downgrade candidates to provide additional SCH resources. Once the SCH data rates have been adjusted, the technique 50 may repeat, as illustrated in FIG. 3. In one embodiment, the transmitter 30 repeats the technique 50 once every 16 FCH frames (i.e., once every 0.32 seconds). As described above, prior to restarting the technique 50, and $T_{old}^{i}$ and $H_{old}^{i}$ are set to $T_{current}^{i}$ and $H_{current}^{i}$ respectively.

Many of the modules or blocks described above with reference to FIGS. 3, 4, and 5 may comprise a listing of executable instructions for implementing logical functions. Such a listing can be embodied in a computer-readable medium for use by or in connection with a computer-based system that can retrieve the instructions and execute them to carry out the previously described processes. In the context of this application, the computer-readable medium can contain, store, communicate, propagate, transmit or transport the instructions. By way of example, the computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette, a random access memory (RAM) a read-only memory (ROM), an erasable programmable read-only memory (EPROM or Flash memory), an optical fiber, and a portable compact disk read-only memory (CDROM). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

We claim:

1. A method comprising:
   determining latency values for each of a plurality of mobile devices;
   determining fairness values for each of the plurality of mobile devices, wherein the latency values and the fairness values are at least partially based on QoS parameters or GoS classes, the fairness values corresponding to a fairness scheme; and
   ranking the plurality of mobile devices based on the latency values and the fairness values to create a ranked list of mobile devices that can be employed to manage supplemental data rates for the plurality of mobile devices.

2. The method, as set forth in claim 1, comprising establishing a supplemental channel for at least one of the plurality of mobile devices based on its position in the ranked listed of mobile devices.

3. The method, as set forth in claim 1, comprising revoking a supplemental channel for at least one of the plurality of mobile devices based on its position in the ranked listed of mobile devices.

4. The method, as set forth in claim 1, comprising adjusting a supplemental channel data rate of at least one of the plurality of mobile devices based on its position in the ranked listed of mobile devices.

5. The method, as set forth in claim 4, comprising identifying an upgrade candidate and a downgrade candidate from the plurality of mobile devices, wherein adjusting the supplemental channel data rate comprises adjusting the supplemental channel data rate for the upgrade candidate, the downgrade candidate, or both.

6. The method, as set forth in claim 5, wherein identifying the upgrade candidate comprises identifying a mobile device that was the highest ranked mobile device on the ranked listed of mobile devices and does not currently have the supplemental channel data rate at the maximum allowable rate.

7. The method, as set forth in claim 5, wherein identifying the downgrade candidate comprises identifying a mobile device with an active supplemental channel that had the lowest ranking on the ranked list of mobile devices for a predetermined number of ranking iterations.

8. The method, as set forth in claim 1, wherein ranking the plurality of mobile devices comprises calculating a ranking value for one of the mobile devices based on the fairness value for the mobile device and the latency value for the mobile device.

9. The method, as set forth in claim 1, wherein ranking the plurality of mobile devices comprises calculating a ranking value for one of the mobile devices based on a faster-than-linear function of the latency value for the mobile device, a value representative of the GoS class of the mobile device, a predetermined maximum fairness value, a predetermined maximum latency value, and a priority class overlap parameter.

10. The method, as set forth in claim 1, comprising:
    measuring fundamental channel power for each of the plurality of mobile devices; and
    determining a power adjustment factor for each of the plurality of mobile devices based on the measured fundamental channel power, wherein the latency values for each of the plurality of mobile devices are determined based on the power adjustment factors.

11. The method, as set forth in claim 1, wherein the latency values and the fairness values comprises determining latency values and fairness values based on previous transmissions to each of the plurality of mobile devices.

12. The method, as set forth in claim 1, wherein determining the latency values comprises adjusting the latency value if satisfying all of the users is not feasible.

13. A communications device comprising:
    a module configured to determine latency values for each of a plurality of mobile devices;
    a module configured to determine fairness values for each of the plurality of mobile devices, wherein the latency values and the fairness values are at least partially based on QoS parameters or GoS classes, the fairness values corresponding to a systemic fairness scheme; and
    a module configured to rank the plurality of mobile devices based on the latency values and the fairness values to create a ranked list of mobile devices.

14. The communication device, as set forth in claim 13, wherein the communications device comprises:
    a module configured to measure fundamental channel power for each of the plurality of mobile devices; and
    a module configured to determine a power adjustment factor for each of the plurality of mobile devices based on the measured fundamental channel power, wherein the latency values for each of the plurality of mobile devices are determined based on the power adjustment factors.

15. The communication device, as set forth in claim 13, wherein the communications device comprises a module configured to adjust a supplemental channel data rate of one of the plurality of mobile devices based on its position in the ranked listed of mobile devices.

16. The communication device, as set forth in claim 13, wherein the communication device comprises a wireless telephone base station.

17. A wireless telephone transmitter comprising:
   a module configured to determine a power adjustment for each of a plurality of mobile devices based on the channel conditions for each of the mobile devices;
   a module configured to determine an indicator of a satisfaction level of each of the plurality of wireless devices;
   a module configured to determine an indicator of how fairly the wireless telephone transmitter is allocating supplemental channel data rates, the fairness indicator corresponding to a fairness scheme; and
   a module configured to rank the plurality of wireless devices based at least partially on the power adjustment, the fairness indicator, and the satisfaction indicator.

18. The wireless telephone transmitter, as set forth in claim 17, comprising a module configured to allocate supplemental channel data rates to one or more of the plurality of wireless device based on the rank of the wireless device.

* * * * *